US006622163B1

(12) United States Patent
Tawill et al.

(10) Patent No.: US 6,622,163 B1
(45) Date of Patent: Sep. 16, 2003

(54) SYSTEM AND METHOD FOR MANAGING STORAGE RESOURCES IN A CLUSTERED COMPUTING ENVIRONMENT

(75) Inventors: Ahmad H. Tawill, Round Rock, TX (US); Nam V. Nguyen, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 09/524,401

(22) Filed: Mar. 9, 2000

(51) Int. Cl.[7] .............................................. G06F 15/167
(52) U.S. Cl. ........................ 709/211; 709/200; 709/203; 709/220; 709/221; 712/15; 713/100; 714/6
(58) Field of Search ................................. 709/203, 211, 709/220, 221, 200; 711/164; 712/15; 713/100; 714/6

(56) References Cited

U.S. PATENT DOCUMENTS

| | | | |
|---|---|---|---|
| 5,757,642 A | | 5/1998 | Jones |
| 5,933,824 A | | 8/1999 | DeKoning et al. ............. 707/8 |
| 6,185,601 B1 | * | 2/2001 | Wolff .......................... 709/203 |
| 6,209,023 B1 | * | 3/2001 | Dimitroff et al. ........... 709/211 |
| 6,247,099 B1 | * | 6/2001 | Skazinski et al. ........... 711/141 |
| 6,338,110 B1 | * | 1/2002 | van Cruyningen .......... 710/317 |
| 6,430,645 B1 | * | 8/2002 | Basham ....................... 710/305 |
| 6,449,730 B2 | * | 9/2002 | Mann et al. .................... 714/6 |
| 6,484,245 B1 | * | 11/2002 | Sanada et al. .............. 711/164 |
| 6,493,804 B1 | * | 12/2002 | Soltis et al. ................. 711/152 |
| 6,532,538 B1 | * | 3/2003 | Cronk et al. .................... 713/2 |

FOREIGN PATENT DOCUMENTS

| | | | |
|---|---|---|---|
| EP | 0033915 A1 | 8/1981 | |
| WO | WO 98/28684 | 7/1998 | ............. G06F/9/46 |

OTHER PUBLICATIONS

Paul Massiglia, "Fibre Channel, Storage Area Network, and Disk Array Systems", Apr. 13, 1998, A White Paper from Adaptec, Inc.*
Singapore Patent Application Ser. #2001007764 Search Report, Mailed Oct. 18, 2002.
White Paper "Microsoft Windows NT Clusters", Microsoft Exchange 5.5, Microsoft Corporation, 1997.
Pending U.S. patent application Ser. No. 09/464,843, entitled "Method For Storage Device Masking In A Storage Area Network And Storage Controller And Storage Subsystem For Using Such A Method" by Luning et al: Dell U.S.A., L.P., Filed Dec. 16, 1999.
Pending U.S. patent application Ser. No. 09/491,578, entitled "System And Method For Disk And Tape Sharing In A Multi–Computer Environment" by Schubert, et al.: Dell U.S.A., L.P., patent #6,460113 B1 Oct. 1, 2002, Filed Jan. 25, 2000.

* cited by examiner

Primary Examiner—Kenneth R. Coulter
Assistant Examiner—Hai V. Nguyen
(74) Attorney, Agent, or Firm—Baker Botts L.L.P.

(57) ABSTRACT

A system and method for managing storage resources in a clustered computing environment are disclosed. A method incorporating teachings of the present disclosure may include holding a reservation on a storage resource for a first node of a clustered computing environment. A third party process log out for the first node may be performed and the reservation held for the first node may be released.

23 Claims, 2 Drawing Sheets

SYSTEM AND METHOD FOR MANAGING STORAGE RESOURCES IN A CLUSTERED COMPUTING ENVIRONMENT

TECHNICAL FIELD OF THE DISCLOSURE

The present disclosure relates in general to the field of data storage systems and, more particularly, to a system and method for managing storage resources in a clustered computing environment.

BACKGROUND OF THE DISCLOSURE

Storage area networks (SANs) often include a collection of data storage resources communicatively coupled to a plurality of nodes such as workstations and servers. In the present disclosure, the term "node" and "server" are used interchangeably, with the understanding that a "server" is one type of "node".

Within a SAN, a server may access a data storage resource across a fabric using the Fibre Channel protocol. The Fibre Channel protocol may act as a common physical layer that allows for the transportation of multiple upper layer protocols, such as the small computer system interconnect (SCSI) protocol. In a SAN environment, the SCSI protocol may assign logical unit numbers (LUNs) to the collection of data storage resources. The LUNs may allow a server within a SAN to access specific data storage resources by referencing a SCSI LUN for a specific data storage resource.

Though a Fibre Channel storage system can offer a great deal of storage capacity, the system can also be very expensive to implement. As a result, users often seek to share the available storage provided by the system among multiple servers. Unfortunately, if a server coupled to a given SAN uses the MICROSOFT WINDOWS NT operating system, the server may attempt to take ownership of any LUN visible to the server. For example, if a particular server detects several LUNs when the server boots, it may assume each LUN is available for its use. Therefore, if multiple WINDOWS NT servers are attached to a storage pool or a collection of data storage resources, each server may attempt to take control of each LUN in the storage pool. This situation can lead to conflicts when more than one server attempts to access the same LUN.

A user seeking to solve this problem may partition or zone the available storage through filtering or through the use of miniport drivers that have LUN masking capabilities. In effect, this partitioning may prevent a server running WINDOWS NT from seeing storage capacity that is not assigned to it. This approach may be effective for stand-alone servers, but the approach has several shortcomings in a clustered computing environment.

Clustering involves the configuring of a group of independent servers so that they appear on a network as a single machine. Often, clusters are managed as a single system, share a common namespace, and are designed specifically to tolerate component failures and to support the addition or subtraction of components in a transparent manner. Unfortunately, because a cluster may have two or more servers that appear to be a single machine, the partitioning techniques mentioned above may prove an ineffective solution for avoiding conflicts when the two or more servers attempt to access the same LUN.

MICROSOFT CLUSTER SERVER (MSCS) embodies one currently available technique for arbitrating conflicts and managing ownership of storage devices in a clustered computing environment. An MSCS system may operate within a cluster that has two servers, server A, which may be in charge, and server B. In operation, server A may pass a periodic heartbeat signal to server B to let server B know that server A is "alive". If server B does not receive a timely heartbeat from server A, server B may seek to determine whether server A is operable and/or whether server B may take ownership of any LUNs reserved for server A. Unfortunately, these MSCS system may utilize SCSI target resets during this process, and the SCSI resets may create several problems. For example, a typical SCSI reset in the MSCS system may cause all servers within a given Fibre Channel system to abort their pending input/output "I/O" processes. These aborted I/O processes may eventually be completed but not until the bus settles. This abort/wait/retry approach can have a detrimental effect on overall system performance.

In addition to this potential effect on performance, the MSCS system and its use of SCSI resets may have a detrimental effect on overall system reliability. In operation, the MSCS system may only account for one SCSI reset at a time. The inability to account for subsequent SCSI resets may lead to unexpected behavior and decrease system reliability.

SUMMARY OF THE DISCLOSURE

In accordance with the present disclosure, a system and method for managing storage resources in a clustered computing environment are disclosed that provide significant advantages over prior developed techniques. The disclosed system and method may allow for storage resource management and conflict arbitration with a reduced reliance on SCSI resets.

According to one aspect of the present disclosure, a method for managing storage resources in a clustered computing environment may include holding a reservation on a storage resource for a first node of the clustered computing environment. The node may be, for example, a server, a workstation, or any other computing device included within the cluster.

A third party process log out for the first node may be performed and the reservation held for the first node may be released. In one embodiment, the third party process log out may occur in response to a log out command sent on behalf of the first node. The third party process log out command may be sent, for example, by a second node or a Fibre Channel switch. The third party process log out command may include identification information that identifies the first node as the sender of the log out command even though the first node was not the actual sender. The identification information may include, for example, a world wide name and a source identifier assigned to the first node.

Managing storage resources in a clustered computing environment may additionally involve the zoning of a Fibre Channel storage system. A zone may group a first node with a second node and a plurality of storage resources such as hard drives and other data storage devices. In the zoned system, a second node may log itself out after a third party process log out command has been issued for a first node. After the two nodes are logged out, a loop initialization protocol (LIP) link reset may be initiated, a state change notification may be generated, and any functioning nodes may re-login.

According to another aspect of the present disclosure, a method for managing storage resources in a clustered computing environment may include receiving a reservation command that seeks to reserve a storage resource for a node within the cluster. In response to the reservation command, a SCSI persistent reserve out command with a service action of reserve may be issued to reserve the storage resource for the node. This persistent reserve may hold a clearable reservation on the storage resource. In one embodiment, the reservation may be cleared by issuing a SCSI persistent reserve out command with a service action of clear. The persistent reserve commands may allow LUN reservations to be individually released as opposed to clearing several LUN reservation at once with a SCSI reset.

According to another aspect of the present disclosure, a computer system operable to manage storage resources in a clustered computing environment may include a first node, a second node, and a resource management engine operable to log out the first node in response to a failure by the second node to receive a timely heartbeat signal from the first node. The system may also include a computer readable medium storing the resource management engine and a central processing unit communicatively coupled to the computer readable medium and operable to execute the resource management engine.

In one embodiment, the system may also include a plurality of computing platforms communicatively coupled to the first node. These computing platforms may be, for example, a collection of networked personal computers. The system may also include a Fibre Channel switch communicatively coupled to the first node and to a plurality of storage resources. The Fibre Channel switch may, in some embodiments, include a central processing unit operable to execute a resource management engine.

A system and method incorporating teachings of the present disclosure may provide significant improvements over conventional cluster resource management solutions. For example, the disclosed techniques may be operable to better manage and arbitrate storage resource conflicts. As discussed above, a SCSI reset in a clustered computing environment can result in the initiation of an abort/wait/retry approach to several I/O processes, which can have a detrimental effect on overall system performance. The teachings of the present disclosure may help reduce reliance on SCSI resets and the resulting performance degradations.

In addition, the teachings of the present disclosure may facilitate the avoidance of system reliability problems associated with SCSI resets in a clustered computing environment. A conventional cluster resource management system, such as MSCS, may be unable to account for SCSI resets initiated during the bus disturbance of an earlier SCSI reset. This limitation may lead to unexpected behavior and decrease system reliability. Because the teachings of the present disclosure may facilitate the avoidance of at least some SCSI resets, system reliability may be improved.

Other technical advantages should be apparent to one of ordinary skill in the art in view of the specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE DISCLOSURE

Figure 1:
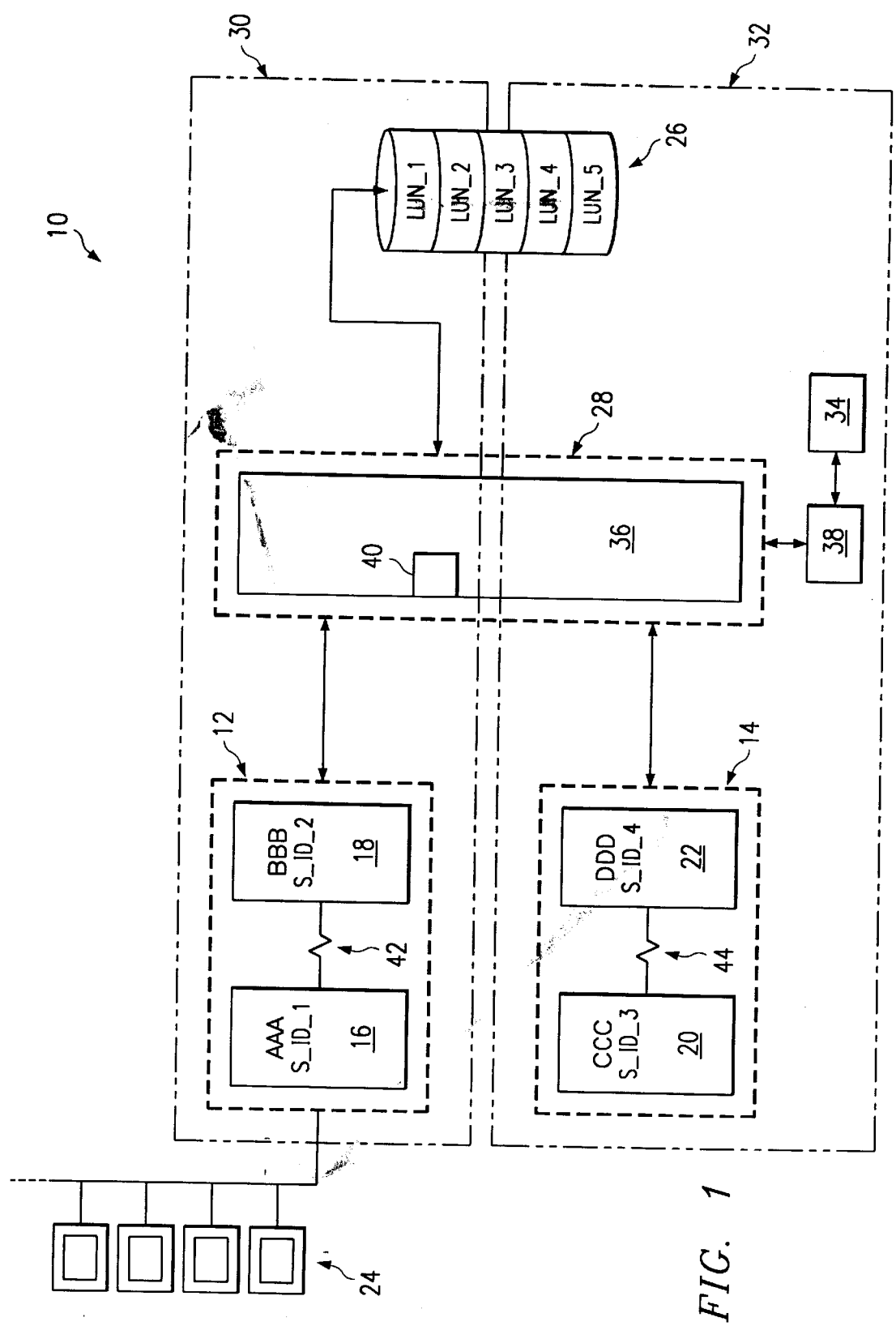
FIG. 1 depicts a component diagram of a storage area network including one embodiment of a resource management engine that incorporates teachings of the present disclosure.

FIG. 1 depicts a general block diagram of a storage area network (SAN), indicated generally at 10. SAN 10 includes two clustered computing systems, clusters 12 and 14. As depicted, cluster 12 includes node 16 and node 18, and cluster 14,includes node 20 and 22. Nodes 16, 18, 20, and 22 may be, for example, servers, workstations, or other network computing devices. As depicted in FIG. 1, cluster 12 may be supporting a number of client devices such as the client personal computers representatively depicted at 24.

SAN 10 may also include a storage pool 26, which may include, for example, a plurality of physical storage devices such as hard disk drives under the control of and coupled to one or more storage controllers. The physical storage devices of storage pool 26 may be assigned LUNs. Some physical storage devices may be grouped into RAID volumes with each volume assigned a single SCSI LUN address. Other physical storage devices may be individually assigned one or more LUNs. However the LUNs are assigned, the LUNs of FIG. 1 may map the available physical storage of storage pool 26 into a plurality of logical storage devices and allow these logical storage devices to be identified and addressed.

In operation, nodes 16, 18, 20, and 22 may communicate with and transfer data to and from storage pool 26 through fabric 28 using fibre channel protocol. As depicted in FIG. 1, nodes 16 and 18 may be grouped into zone 30 with LUN_1 and LUN_2. Similarly, nodes 20 and 22 may be grouped into zone 32 with LUN_3, LUN_4, and LUN_5. Using switch zoning to create zone 30 may prevent nodes 16 and 18 from seeing nodes 20 and 22. Similarly, using switch zoning to create zone 32 may prevent nodes 20 and 22 from seeing nodes 16 and 18. In addition to zoning, the embodiment of FIG. 1 may employ LUN masking. LUN masking may blind a specific node or cluster from seeing certain LUNs. For example, LUN masking may prevent nodes 16 and 18 from seeing LUN_3, LUN_4, and LUN_5.

In the embodiment of FIG. 1, nodes 16, 18, 20, and 22 may be assigned a unique world wide name (WWN), which may be an eight byte identifier. The Institute of Electronics Engineers (IEEE) assigns blocks of WWNs to manufacturers so manufacturers can build fiber channel devices with unique WWNs. For illustrative purposes, in the embodiment of FIG. 1, node 16 may have a WWN of "AAA", node 18 may have a WWN of "BBB", node 20 may have a WWN of "CCC", and node 22 may have a WWN of "DDD". As such, nodes 16, 18, 20, and 22 may be uniquely identifiable by other devices coupled to fabric 28.

Nodes 16, 18, 20, and 22 may have identification information in addition to their respective WWNs. For example, according to the fibre channel protocol, when a node such as node 16 is initialized and logs into fabric 28, the node is assigned a fibre channel ID. This ID may be subject to change each time some initialization event occurs, for example, when another node or device logs into fabric 28. As depicted in FIG. 1, fabric 28 has assigned fibre channel IDs as follows: node 16 is S_ID_1, node 18 is S_ID_2, node 20 is S_ID_3, and node 22 is S_ID_4.

In the embodiment of FIG. 1, the various WWNs and fibre channel IDs may be stored in a computer readable medium 34, which may be accessible to devices of SAN 10. As shown in FIG. 1, SAN 10 may include a computing device 38 for establishing fabric 28. Such a computing device may include a CPU communicatively coupled to computer readable medium 34. Switch 36 may also have at least one port 40 for interfacing with other devices to form an overall fibre channel network.

In one embodiment of a system incorporating teachings of the present disclosure, computing device 38 may be operable to execute a resource management engine, which may be stored in computer readable medium 34. The resource management engine may be operable to perform several functions. For example, the resource management engine may be operable to access a maintained list of the WWNs and the fibre channel IDs of SAN 10 devices. In addition, the resource management engine may be operable to recognize a SCSI reset command issued by a node and to convert the command into a storage resource releasing command. The storage resource releasing command may be, for example, a third party process log out or a SCSI persistent reserve out command with a clear action.

In a typical MSCS cluster, a SCSI reset command may be issued when a node like node 18 or 20 fails to acknowledge receipt of a timely heartbeat 42 or 44 from a respective cluster mate. Heartbeats 42 and 44 may allow nodes 18 and 22 respectively to "see" if their cluster mates are still functioning.

If, for example, node 18 can no longer "see" node 16, node 18 may seek to have any LUN reservations held for node 16 released. To accomplish this release, node 18 may send a SCSI reset command to initiate a low-level bus reset of the SCSI buses associated with nodes 16 and 18. In some systems, for example a MSCS system, node 18 may wait some specified amount of time before trying to reserve the LUNs that had been reserved by node 16. The waiting allows node 16 to regain control of the LUNs reserved to it before the SCSI reset. As such, if node 16 is "alive" despite node 18's failure to receive heartbeat 42, node 16 may be able to re-establish its resource reservations and in so doing let node 18 know that it is "alive".

Unfortunately, as mentioned above, a SCSI reset in a clustered computing environment can have a detrimental effect on overall system performance and system reliability. The disclosed system and resource management engine may help limit a clustered computing environment's reliance on SCSI resets in several different ways. Example techniques for avoiding SCSI resets may be better understood through consideration of FIGS. 2 and 3.

Figure 2:
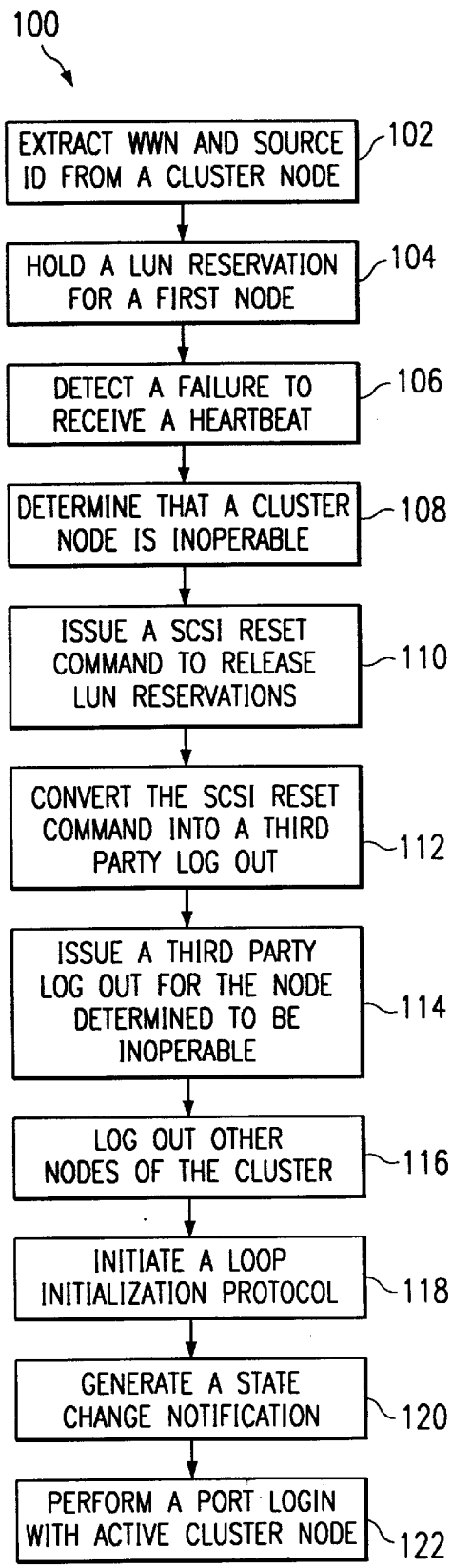
FIG. 2 shows a flow diagram for one embodiment of a method for managing storage resources in a clustered computing environment in accordance with teachings of the present disclosure.

FIG. 2 depicts a flow diagram of one embodiment of a method 100 for managing storage resources in a clustered computing environment. The method of FIG. 2 may be implemented by a resource management engine. executing on a storage controller attached to a SAN fabric. In some embodiments, the resource management engine may be executing on a CPU associated with a switch like switch 36 of FIG. 1. In other embodiments, the CPU may be associated with a SAN device other than the switch. For example, a resource management engine may be executing on one or more nodes of a SAN.

During the operation of a SAN, a port login (PLOGI) command may be received. As is known in the art, a PLOGI command is a fibre channel command wherein a node logs into a storage device attached to a SAN. A node may execute a PLOGI command after the fabric has assigned a fibre channel ID (S_ID) to the node. As is also conventionally known, the S_ID of a node may be assigned when a node executes a fabric login (FLOGI) command.

At step 102, the S_ID and the WWN of a cluster node may be extracted. The extraction may occur at different times. For example, the extraction may occur when a node issues a PLOGI command. Once extracted, the S_ID and the WWN may be updated and may be stored in a computer readable medium. In some embodiments, this computer readable medium may be part of a SAN and may be accessible to several devices of the SAN.

At step 104, a LUN reservation may be held for a given node. In effect, the given node may have the exclusive right to use the reserved LUN. As is mentioned above, cluster nodes often communicate with one another using a heartbeat signal. At step 106, a SAN device may detect a failure to receive a timely heartbeat signal. Though the failure to receive a heartbeat signal may only indicate a failed communication link between the heartbeat sender and the heartbeat receiver, the failure may result, as shown at step 108, in the determination that a cluster node is inoperable.

In the embodiment of FIG. 2, the determination that a node is inoperable, may cause another node to issue a SCSI reset. As shown at step 110, a SCSI reset command may be sent to release LUN reservations held for the node believed to be inoperable (the "dead" node). At step 112, the SCSI reset command may be converted into a third party process log out. This conversion may, for example, be performed by an executing resource management engine.

At step 114 a log out command for the "dead" node may be sent on the "dead" node's behalf by a third party. For example, a resource management engine may access a computer readable medium storing the "dead" node's S_ID and WWN. The resource management engine may use the S_ID and the WWN of the "dead" node to log out the "dead" node. This third party process log out may result in the releasing of LUN reservations held for the logged out node.

As shown at step 116 of FIG. 2, other nodes of a cluster may also log out or be logged out and a loop initialization protocol (LIP) link reset may be initiated. The LIP link reset of step 118 may be followed by step 120's generation of a state change notification. In the embodiment of FIG. 2, the state change notification may cause active cluster nodes, nodes that are not dead, to perform a port login and to seek LUN reservations. The port login of active cluster nodes may be seen at step 122. If the "dead" node was not dead, it may be able to regain its LUN reservations. If the "dead" node was dead, other cluster nodes may now be able to capture the LUN reservations held by the "dead" node. In effect, the storage resources held by the dead node will be made available to "live" nodes—resulting in a better utilization of storage resources—without a SCSI reset.

Figure 3:
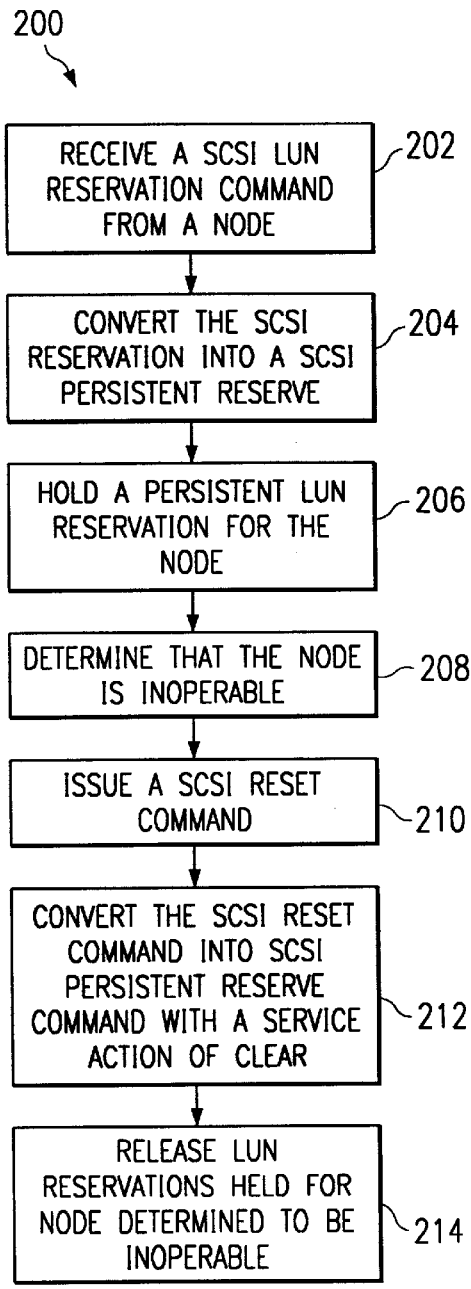
FIG. 3 shows a flow diagram for another embodiment of a method for managing storage resources in a clustered computing environment in accordance with teachings of the present disclosure.

Another embodiment of a method 200 for managing storage resources in a clustered computing environment may be seen in FIG. 3. The method of FIG. 3, like the method of FIG. 2, may be implemented by a resource management engine. This engine may be located any number of places. For example, the engine may be located at a switch, a node, or a storage control attached to a Fibre Channel fabric.

As shown at step 202, method 200 may involve the receiving of a SCSI LUN reservation command. A typical SCSI reservation command may be cleared with a SCSI reset. As mentioned above, SCSI resets may cause a number of problems within a clustered computing environment. As such, at step 204, the SCSI reserve command may be converted to a SCSI persistent reserve out command with a service action of RESERVE. The conversion from SCSI reserve to SCSI persistent reserve may be performed, for example, by an executing resource management engine. The persistent reserve out command may hold a persistent LUN reservation as shown at step 206 for the holding node, the node issuing the SCSI reserve command.

At step 208, it may be determined that the holding node is inoperable. In response to this determination, a SCSI reset command may be issued. The SCSI reset command of step 210 may be converted at step 212 to a SCSI persistent reserve command with a service action of CLEAR. In operation, the SCSI persistent reserve command with a service action of CLEAR may release the LUN reservations held by the initial SCSI persistent reserve out command. The LUN releasing of step 214 may effectively release storage resources held by nodes determined to be inoperable at step 208. This may result in a better utilization of storage resources within a clustered computing environment, and the better utilization may be accomplished without employing SCSI resets.

Various changes to the above embodiments are contemplated by the present disclosure. For example, embodiments of the present disclosure may be implemented in SANs having any number of topologies. There may be, for example, numerous storage controllers, there may be a resource management engine executing on each node of a cluster, or there may be a single resource management engine executing within each zone of a clustered computing environment.

Although the disclosed embodiments have been described in detail, it should be understood that various changes, substitutions and alterations can be made to the embodiments without departing from their spirit and scope.

What is claimed is:

1. A method for managing storage resources in a multiple cluster computing environment, the method comprising:
   holding a reservation on a storage resource for a first node of a cluster within the multiple cluster computing environment;
   failing to receive a heartbeat signal from the first node at the second node;
   determining that the first node is not functioning as a result of the failure to receive the heartbeat signal;
   determining that the first node is not functioning at a second node within the cluster;
   performing a third party process log out for the first node; and
   releasing the reservation held for the first node.

2. The method of claim 1, further comprising initiating the third party process log out from a second node of the multiple cluster computing environment.

3. The method of claim 1, further comprising initiating the third party process log out from a switch associated with the multiple cluster computing environment.

4. The method of claim 1, further comprising creating a zone within a Fibre Channel storage system, the zone comprising the first node of the multiple cluster computing environment, the second node of the multiple cluster computing environment, and at least one storage resource.

5. The method of claim 1, wherein the storage resource comprises a hard drive.

6. The method of claim 1, further comprising;
   storing identification information about the first node; and
   using the identification information to issue a third party process log out request.

7. The method of claim 1, further comprising:
   assigning a world wide name and a source identifier to the first node; and
   using the world wide name and the source identifier to issue the third party process log out request on behalf of the first node.

8. The method of claim 1, further comprising:
   assigning a world wide name and a source identifier to the first node;
   assigning a second world wide name and a second source identifier to the second node;
   using the world wide name and the source identifier to issue the third party process log out request for the first node;
   logging out the first node; and
   logging out the second node.

9. The method of claim 1, wherein the first node comprises a server.

10. The method of claim 1, wherein the first node comprises a workstation.

11. The method of claim 1, further comprising logging out the second node of the multiple cluster computing environment.

12. The method of claim 11, further comprising generating a state change notification with a switch associated with the multiple cluster computing environment.

13. The method of claim 11, further comprising:
    initiating a loop initialization protocol link reset; and
    generating a state change notification in response to the loop initialization protocol link reset.

14. The method of claim 11, further comprising: in response to the state change notification, performing a responsive port login with the second node.

15. A method for managing storage resources in a multiple cluster computing environment, the method comprising:
    receiving a small computer system interface reservation command seeking to reserve a storage resource for a node of a cluster within the multiple cluster computing environment; and
    in response to the reservation command, issuing a small computer system interface persistent reserve out command with a service action of reserve to reserve the storage resource for the node.

16. The method of claim 15, wherein a miniport driver receives the reservation command and issues the persistent reserve out command.

17. The method of claim 15, further comprising releasing a reservation held for the node by issuing a small computer system interface persistent reserve out command with a service action of clear.

18. A computer system, comprising:
    a first node of a cluster within a multiple cluster computing environment;
    a second node of the cluster within the multiple cluster computing environment; and
    a resource management engine operable to convert a small component system interface reset command into a storage resource releasing command.

19. The system of claim 18, wherein the resource releasing command comprises a third party process log out.

20. The system of claim 18, wherein the resource releasing command comprises a small component system interface persistent reserve out command with a clear action.

21. The system of claim 18, further comprising:

a computer readable medium storing the resource management engine; and a central processing unit communicatively coupled to the computer readable medium and operable to execute the resource management engine.

22. The system of claim 21, further comprising:

a plurality of computing platforms communicatively coupled to the fast node;

a Fibre Channel switch communicatively coupled to the first -node; and a plurality of storage devices communicatively coupled to the Fibre Channel switch.

23. The system of claim 22, wherein the Fibre Channel switch comprises the central processing unit.

* * * * *

UNITED STATES PATENT AND TRADEMARK OFFICE
CERTIFICATE OF CORRECTION

PATENT NO. : 6,622,163 B1
DATED : September 16, 2003
INVENTOR(S) : Tawil et al.

It is certified that error appears in the above-identified patent and that said Letters Patent is hereby corrected as shown below:

<u>Title page,</u>
Item [12], delete "Tawill et al." and replace with -- Tawil et al. --.
Item [75], Inventors, delete "Ahmad H. Tawill" and replace with
-- Ahmad H. Tawil --.

Signed and Sealed this

Third Day of February, 2004

JON W. DUDAS
*Acting Director of the United States Patent and Trademark Office*